Nov. 15, 1949 F. A. LANE 2,488,206
MECHANICAL MOVEMENT
Filed April 11, 1946 2 Sheets-Sheet 1
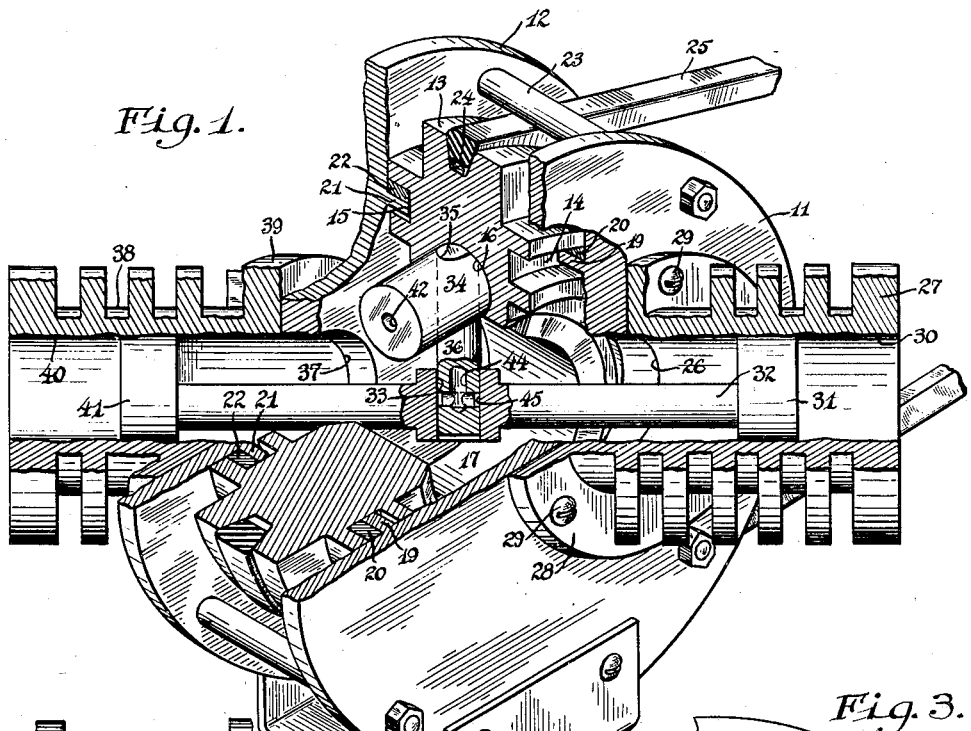
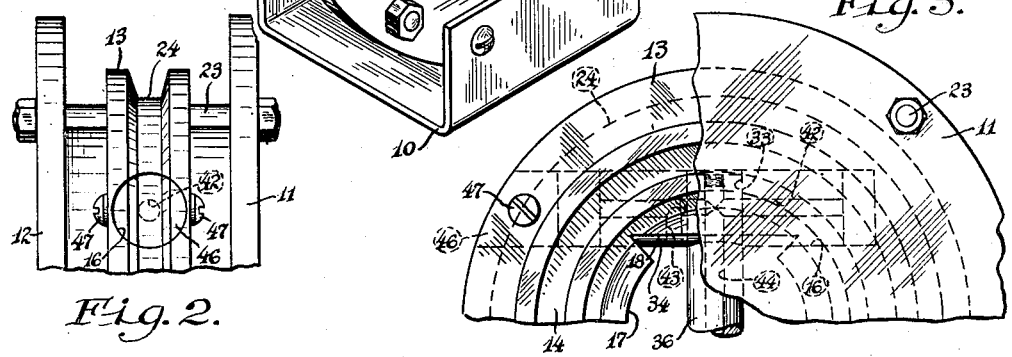
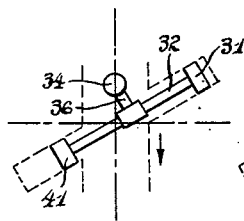
Fig. 4.
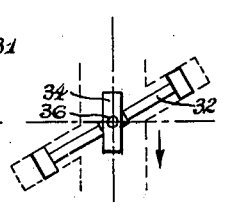
Fig. 5.
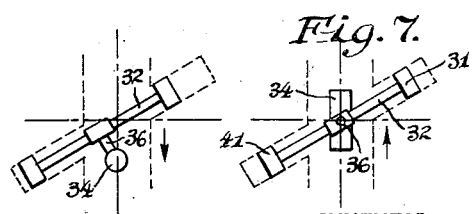
Fig. 6.    Fig. 7.
INVENTOR.
FRED A. LANE,
BY:
Harold B. Hood.
ATTORNEY INVENTOR.
FRED A. LANE,
BY: Harold B. Hood.
ATTORNEY.

Patented Nov. 15, 1949

2,488,206

UNITED STATES PATENT OFFICE 2,488,206

MECHANICAL MOVEMENT

Fred A. Lane, Shelburn, Ind., assignor to Lane Motors, Inc., Terre Haute, Ind., a corporation of Indiana Application April 11, 1946, Serial No. 661,373

14 Claims. (Cl. 74—60)

1

The present invention relates to a mechanical movement, and is particularly concerned with a device for converting rotary movement into reciprocatory movement, or vice versa. Further objects of the invention are to provide an extremely exact device for converting movement, whose efficiency shall be high, whose cost of production shall be low, and which shall be of such character that its rate of wear and susceptibility to breakdown shall likewise be very low. Further objects of the invention will appear as the description proceeds.

To the accomplishment of the above and related objects, my invention may be embodied in the forms illustrated and described in the accompanying drawings, attention being called to the fact that the drawings are illustrative only, and that change may be made in the specific constructions illustrated and described, so long as the scope of the appended claims is not violated.

Fig. 1 is a broken perspective view of one embodiment of my invention;

Fig. 2 is a fragmentary elevation thereof;

Fig. 3 is a fragmentary end elevation of said device;

Figs. 4 to 7 are diagrammatic views illustrating the operation of the device;

Figure 8:
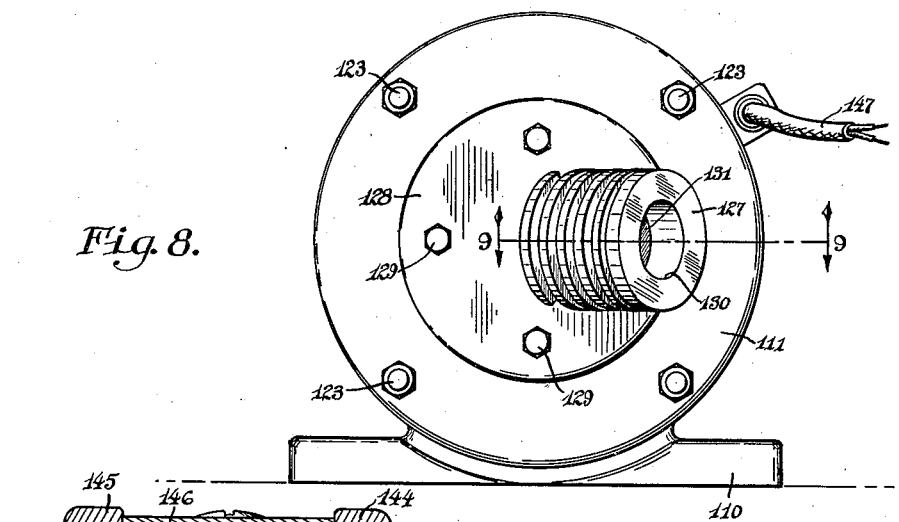
Fig. 8 is an end elevation of a modified form of my invention.

Referring more particularly to Figs. 1 to 3 inclusive, it will be seen that I have illustrated the conventional base 10 in which my mechanical movement is mounted. A pair of allochiral side plates 11 and 12 are associated with opposite sides of an annular rotor 13. On one side, said rotor is formed with a trackway 14, defined by a pair of annular flanges, and on its opposite side, said rotor is formed with a similar, concentric trackway 15 likewise defined by a pair of annular flanges. Said rotor is further formed with a chordal socket 16 so positioned as to intersect the inner periphery 17 of the rotor, as at 18. The open end of said socket 16 is closed by a suitably formed plug 46 held in place by screws 47 or other suitable fastening means.

The plate 11 is formed with an axially projecting annular flange 19 fitting within the trackway 14, and a suitable antifriction bushing 20 is interposed between the flange 19 and the outer one of the flanges defining the trackway 14. The construction is such that the flange 19 and the bushing 20 form an oil-sealing journal support for the rotor 13. Similarly, the plate 12 is

2 formed with a corresponding flange 21 carrying a corresponding bushing 22 and received within the trackway 15. The plates 11 and 12 are connected together by means of a series of bolts 23.

In the form of the invention illustrated in Figs. 1 to 3, the outer periphery of the rotor 13 is formed with a V-groove 24 for the reception of a belt 25, whereby the rotor may be driven, or whereby the rotor may drive an external mechanism.

The plate 11 is formed with an aperture 26 whose center is offset from the axis of the rotor 13; and a cylinder 27 is mounted upon the external surface of the plate in enveloping relationship with said aperture 26. As shown, the cylinder 27 is provided at one end with a flange 28 arranged at an angle other than 90° to the axis of the cylinder and secured to the plate 11 by means of screws 29, or the like. The bore 30 of the cylinder 27 has its axis so related to the surface of the plate 11 as to intersect the axis of the rotor 13.

A piston 31 is reciprocably mounted in said cylinder bore 30, and a connecting rod 32 extends into the region of intersection of the axes of said cylinder bore 30 and said rotor 13. In that region, the connecting rod 32 is formed with a bore 33.

Reciprocably and oscillably mounted in the socket 16 is an element 34 which is likewise formed with a transverse bore 35. Said element 34 and the piston rod 32 are connected by means of a pin 36 one end of which is oscillably received in the bore 35 of the element 34, and the other end of which is oscillably and reciprocably received in the bore 33 of the connecting rod 32.

The plate 12 is likewise formed with an aperture 37 off-set from the axis of the rotor 13, the position of the aperture 37 being such that its center lies in the line defined by the axis of the cylinder bore 30. A second cylinder 38, having a flange 39 suitably angularly related thereto, is mounted upon the plate 12 by fastening means (not shown) cooperating with said flange 39 and the plate 12. The axis of the bore 40 of the cylinder 39 is aligned with the axis of the cylinder bore 30. Reciprocably mounted in said cylinder bore 40 is a piston 41 carried upon the said connecting rod 32.

Preferably, the element 34 will be formed with a longitudinally extending oil passage 42 communicating with the bore 35 and with a radially opening port 43 which opens through the peripheral surface of that portion of the element 34 which is normally disposed within the region 18 in which the socket 16 intersects the inner periphery of the rotor 13. The pin 36 is formed with a longitudinally extending oil passage 44 which opens into the bore 35, and therefore communicates with passage 42; and which also communicates with a radially opening port 45 disposed, at times, within the bore 33.

In Fig. 4, I have diagrammatically illustrated the elements 32, 34 and 36 in the positions which they assume at a time when the piston connecting rod 32 is substantially at one end of its stroke. That position is 90° in advance of the position of the parts illustrated in Fig. 1. Thus, when the element 34 is in a substantially vertical position and removed from the position illustrated in Fig. 1 substantially 90° in a clockwise direction as viewed in Fig. 1, the piston 31 will be substantially at the outer end of its cylinder, while the piston 41 will be substantially fully retracted from its cylinder. Now, as the rotor turns in a counter-clockwise direction, as viewed in Fig. 1, the angular relationship between the axis of the connecting rod 32 and the axis of the rotor 13 will cause said connecting rod to be moved toward the left, as viewed in Fig. 1, to the position illustrated in Fig. 1. Meantime, of course, the element 34 will be rocked about its axis in a clockwise direction as viewed from the left of Fig. 1. The condition of the parts is illustrated diagrammatically in Fig. 5.

As the rotor 13 continues to rotate, the element 34 will be carried into a vertical position at the lefthand side of Fig. 1 and will be further rocked in a clockwise direction. Meantime, as the parts have moved from the position of Fig. 4 to the position of Fig. 6, the element 34 will have been reciprocated from the righthand limit of its position, as viewed in Fig. 3, to the lefthand limit of its position. The parts now occupy the positions illustrated in Fig. 6.

Another 90° of rotation of the rotor 13 will carry the parts into the positions illustrated in Fig. 7, in which the pistons 31 and 41 again occupy median positions; and a further 90° of rotation of the rotor 13 will carry the parts into the positions illustrated in Fig. 4.

The reciprocation of element 34, and the fact that the port 43 opens into the chamber defined by the side plates 11 and 12 and the inner periphery of the rotor 13, produces an oil pumping action which will result in circulation of oil through the passages in the elements 34 and 36 to improve the lubrication of the mechanism. Of course, the said chamber defined by the side plates and the inner periphery of the rotor at all times contains oil.

Figure 9:
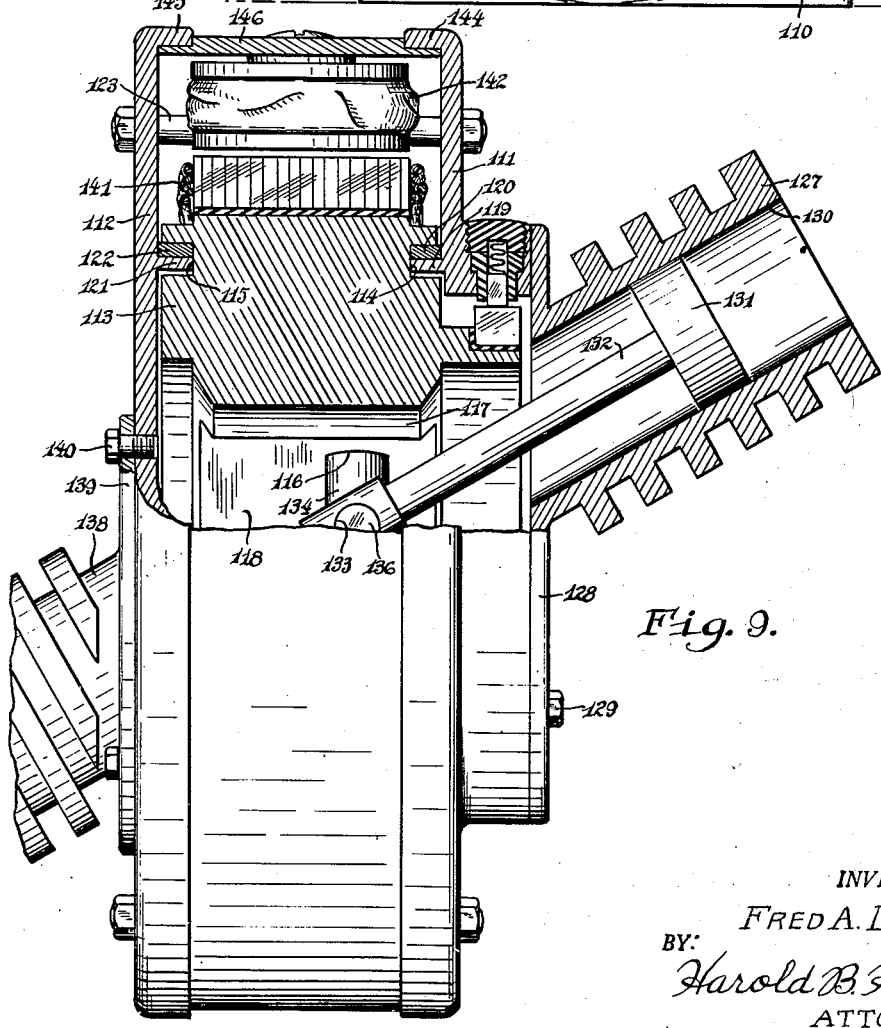
Fig. 9 is a plan view thereof, parts being shown in section.

In Figs. 8 and 9, I have shown a modified form of my invention, in which an electric motor or generator is built into the unit. Side plates 111 and 112 cooperate with an annular rotor 113 which is formed with concentric annular trackways 114 and 115 on its opposite faces. Said rotor is provided with a socket 116 which intersects the inner periphery 117 thereof in the region indicated by the reference numeral 118. Axially inwardly projecting peripheral flanges 119 and 121 on the side plates support antifriction bushings 120 and 122 to provide an oil sealing, journal mounting for the rotor 113 whose trackways 114 and 115 receive said flanges and bushings. The side plates 111 and 112 are connected together by a series of bolts 123.

A cylinder 127 having a flange 128 is secured to the side plate 111 by screws 129, or the like, with the axis of its bore 130 arranged to intersect the axis of the rotor 113. A piston 131 is reciprocably mounted in the cylinder bore 130 and is carried upon a connecting rod 132 which is formed with a transverse bore 133. An element 134, reciprocable in the socket 116, is formed with a transverse bore (not shown) like the bore 35 of the element 34; and a pin 136 connects said element 134 with the connecting rod 132, having a portion oscillably received in the bore of said element 134 and a portion oscillably reciprocably received in the bore 133.

A second cylinder 138, provided with a flange 139 secured to the plate 112 by screws 140, or the like, has the axis of its bore aligned with the axis of the cylinder bore 130, the line of said axes intersecting the axis of the rotor 113.

The operation of the mechanism thus far described is, of course, identical with that of the embodiment of my invention illustrated in Figs. 1, 2 and 3.

In the present embodiment of the invention, the outer periphery of the rotor 113 carries the rotor winding 141 of an electric motor; and stator windings, more or less diagrammatically indicated at 142, are externally operatively associated with said rotor winding 141. In this embodiment of the invention, the peripheries 144 and 145 of the plates 111 and 112 are inturned for cooperative association with a closure ring 146 which encloses the motor parts.

Obviously, when the motor is energized, through the leads 147, the rotor 113 will be driven and the piston 131, together with the piston mounted in the cylinder 138, will be reciprocated in the manner above described.

While I have referred to the parts 141 and 142 as motor parts, it will be obvious that they may be equally well considered as generator parts, and that current will be fed through the leads 147 if the pistons 131 are reciprocated to produce rotation of the rotor 113.

Obviously, the cylinders 27, 38, 127 and 138 are more or less diagrammatically illustrated here; and in any physical embodiment of the invention, those cylinders will be closed at their outer ends by suitable heads. The cylinders may be parts of pumping mechanisms; or they may be parts of internal combustion engines or fluid expansion engines.

I claim as my invention:

1. Motion converting mechanism comprising a base, an annular rotor mounted on said base for rotation about its own axis, a chordal socket formed in said rotor and intersecting the inner periphery of said rotor, an element reciprocably mounted in said socket and formed with a transverse bore, a connecting rod intersecting the axis of said rotor and formed with a transverse bore, a pin connecting said element and said connecting rod and received in said element bore and said connecting rod bore, a piston operatively associated with said connecting rod, and a cylinder fixed with respect to said base and reciprocably receiving said piston.

2. Motion converting mechanism comprising a base, an annular rotor mounted on said base for rotation about its own axis, a chordal socket formed in said rotor and intersecting the inner periphery of said rotor, an element reciprocably mounted in said socket and formed with a transverse bore, a connecting rod intersecting the axis of said rotor and formed with a transverse bore, a pin connecting said element and said connecting rod, said pin having a portion oscillably received in said element bore and a portion oscillably and reciprocably received in said connecting rod bore, a piston operatively associated with said connecting rod, and a cylinder fixed with respect to said base and reciprocably receiving said piston.

3. Motion converting mechanism comprising a base, an annular rotor mounted on said base for rotation about its own axis, a chordal socket formed in said rotor and intersecting the inner periphery of said rotor, an element reciprocably mounted in said socket and formed with a transverse bore, a connecting rod intersecting and traversing the axis of said rotor and formed with a transverse bore, a pin connecting said element and said connecting rod and received in said element bore and said connecting rod bore, two pistons, respectively operatively associated with said connecting rod and equidistantly spaced from said connecting rod bore on opposite sides thereof, and a cylinder for each piston, said cylinders being fixed with respect to said base and respectively reciprocably receiving their associated pistons.

4. Motion converting mechanism comprising a base, an annular rotor mounted on said base for rotation about its own axis, a chordal socket formed in said rotor and intersecting the inner periphery of said rotor, an element reciprocably mounted in said socket and formed with a transverse bore, a connecting rod intersecting and traversing the axis of said rotor and formed with a transverse bore, a pin connecting said element and said connecting rod, said pin having a portion oscillably received in said element bore and a portion oscillably and reciprocably received in said connecting rod bore, two pistons, respectively operatively associated with said connecting rod and equidistantly spaced from said connecting rod bore on opposite sides thereof, and a cylinder for each piston, said cylinders being fixed with respect to said base and respectively reciprocably receiving their associated pistons.

5. In a device of the class described, an annular rotor, a pair of side plates respectively associated with opposite surfaces of said rotor in oil-sealing and supporting relation, means independent of said rotor removably connecting said side plates together, one of said plates being formed with an aperture whose center is offset from the axis of said rotor, a cylinder mounted on said one plate and enveloping said aperture, a piston reciprocably received in said cylinder, and means providing a motion-converting connection between said rotor and said piston.

6. In a device of the class described, an annular rotor, a pair of side plates respectively associated with opposite surfaces of said rotor in oil-sealing and supporting relation, means independent of said rotor removably connecting said side plates together, one of said plates being formed with an aperture whose center is offset from the axis of said rotor, a cylinder mounted on said one plate and enveloping said aperture, a piston reciprocably received in said cylinder, the other of said plates being formed with an aperture whose center is offset from the axis of said rotor, a cylinder mounted on said other plate and enveloping said last-named aperture, the axes of said cylinders being disposed in a common line intersecting the axis of said rotor, a piston reciprocably received in said first-named cylinder, a piston reciprocably received in said second-named cylinder, connecting rod means for said pistons, and motion-connecting means connecting said rotor with said connecting rod means.

7. In a device of the class described, an annular rotor, a pair of side plates respectively associated with opposite surfaces of said rotor in oil-sealing and supporting relation, means independent of said rotor removably connecting said side plates together, one of said plates being formed with an aperture whose center is offset from the axis of said rotor, a cylinder mounted on said one plate and enveloping said aperture, a piston reciprocably received in said cylinder, the other of said plates being formed with an aperture whose center is offset from the axis of said rotor, a cylinder mounted on said other plate and enveloping said last-named aperture, the axes of said cylinders being disposed in a common line intersecting the axis of said rotor, a piston reciprocably received in said first-named cylinder, a piston reciprocably received in said second-named cylinder, a connecting rod common to said two pistons, and motion-converting means connecting said rotor with said common connecting rod.

8. In a device of the class described, an annular rotor, a chordal socket formed in said rotor and intersecting the inner periphery of said rotor, an element reciprocably mounted in said socket and formed with a transverse bore, a pair of side plates respectively associated with opposite surfaces of said rotor in supporting relation thereto, means independent of said rotor removably connecting said side plates together, one of said plates being formed with an aperture whose center is offset from the axis of said rotor, a cylinder mounted on said one plate and enveloping said aperture, a piston reciprocably received in said cylinder, a connecting rod for said piston intersecting the axis of said rotor and formed with a transverse bore, and a pin connecting said element and said piston rod, and received in said element bore and said connecting rod bore.

9. In a device of the class described, an annular rotor, a chordal socket formed in said rotor and intersecting the inner periphery of said rotor, an element reciprocably mounted in said socket and formed with a transverse bore, a pair of side plates respectively associated with opposite surfaces of said rotor in supporting relation thereto, means independent of said rotor removably connecting said side plates together, one of said plates being formed with an aperture whose center is offset from the axis of said rotor, a cylinder mounted on said one plate and enveloping said aperture, a piston reciprocably received in said cylinder, a connecting rod for said piston intersecting the axis of said rotor and formed with a transverse bore, and a pin connecting said element and said piston rod, said pin having a portion oscillably received in said element bore and a portion oscillably and reciprocably received in said connecting rod bore.

10. In a device of the class described, an annular rotor, a chordal socket formed in said rotor and intersecting the inner periphery of said rotor, an element reciprocably mounted in said socket and formed with a transverse bore, a pair of side plates respectively associated with opposite surfaces of said rotor in supporting relation thereto, means independent of said rotor removably connecting said side plates together, one of said plates being formed with an aperture whose center is offset from the axis of said rotor, a cylinder mounted on said one plate and enveloping said aperture, a piston reciprocably received in said cylinder, the other of said plates being formed with an aperture whose center is offset from the axis of said rotor, a cylinder mounted on said other plate and enveloping said last-named aperture, the axes of said cylinders being disposed in a common line intersecting the axis of said rotor, a piston reciprocably received in said second-named cylinder, connecting rod means for said pistons intersecting and traversing the axis of said rotor and formed with a transverse bore, and a pin connecting said element and said piston rod and received in said element bore and said connecting rod bore.

11. In a device of the class described, an annular rotor, a chordal socket formed in said rotor and intersecting the inner periphery of said rotor, an element reciprocably mounted in said socket and formed with a transverse bore, a pair of side plates respectively associated with opposite surfaces of said rotor in supporting relation thereto, means independent of said rotor removably connecting said side plates together, one of said plates being formed with an aperture whose center is offset from the axis of said rotor, a cylinder mounted on said one plate and enveloping said aperture, a piston reciprocably received in said cylinder, the other of said plates being formed with an aperture whose center is offset from the axis of said rotor, a cylinder mounted on said other plate and enveloping said last-named aperture, the axes of said cylinders being disposed in a common line intersecting the axis of said rotor, a piston reciprocably received in said second-named cylinder, connecting rod means for said pistons intersecting and traversing the axis of said rotor and formed with a transverse bore, and a pin connecting said element and said piston rod, said pin having a portion oscillably received in said element bore and a portion oscillably and reciprocably received in said connecting rod bore.

12. In a device of the class described, an annular rotor, a pair of side plates respectively associated with opposite surfaces of said rotor in oil-sealing and supporting relation, means independent of said rotor removably connecting said side plates together, a chordal socket formed in said rotor and intersecting the inner periphery of said rotor, an element reciprocably mounted in said rotor and formed with a transverse bore, a connecting rod intersecting the axis of said rotor and formed with a transverse bore, a pin connecting said element and said connecting rod and received in said element bore and in said connecting rod bore, a piston operatively associated with said connecting rod, and a cylinder fixed with relation to said plates and reciprocably receiving said piston, said pin and said element being formed with communicating oil passages.

13. In a device of the class described, an annular rotor, a pair of side plates respectively associated with opposite surfaces of said rotor in oil-sealing and supporting relation, means independent of said rotor removably connecting said side plates together, a chordal socket formed in said rotor and intersecting the inner periphery of said rotor, an element reciprocably mounted in said rotor and formed with a transverse bore, a connecting rod intersecting the axis of said rotor and formed with a transverse bore, a pin connecting said element and said connecting rod, said pin having a portion oscillably received in said element bore and a portion oscillably and reciprocably received in said connecting rod bore, a piston operatively associated with said connecting rod, and a cylinder fixed with relation to said plates and reciprocably receiving said piston, said element being formed with a longitudinally-extending oil passage communicating with its bore, and said pin being formed with a longitudinally-extending oil passage provided, in the portion of said pin at times located within said connecting rod bore, with a radially-opening port.

14. In a device of the class described, an annular rotor, a pair of side plates respectively associated with opposite surfaces of said rotor in oil-sealing and supporting relation, means independent of said rotor removably connecting said side plates together, a chordal socket formed in said rotor and intersecting the inner periphery of said rotor, an element reciprocably mounted in said rotor and formed with a transverse bore, a connecting rod intersecting the axis of said rotor and formed with a transverse bore, a pin connecting said element and said connecting rod, said pin having a portion oscillably received in said element bore and a portion oscillably and reciprocably received in said connecting rod bore, a piston operatively associated with said connecting rod, and a cylinder fixed with relation to said plates and reciprocably receiving said piston, said element being formed with a longitudinally-extending oil passage communicating with its bore, and with a radially-opening port within the region of intersection of said socket with the inner periphery of said rotor, and said pin being formed with a longitudinally-extending oil passage provided, in the portion of said pin at times located within said connecting rod bore, with a radially-opening port.

FRED A. LANE.

REFERENCES CITED

The following references are of record in the file of this patent:

UNITED STATES PATENTS

| Number | Name | Date |
|---|---|---|
| 772,022 | Brinley | Oct. 11, 1904 |
| 1,213,850 | Emley | Jan. 30, 1917 |